(12) United States Patent
Vera-Ciro et al.

(10) Patent No.: US 12,260,419 B2
(45) Date of Patent: Mar. 25, 2025

(54) EFFICIENT DATA PROCESSING TO IDENTIFY INFORMATION AND REFORMAT DATA FILES, AND APPLICATIONS THEREOF

(71) Applicant: VEDA Data Solutions, Inc., Washington, DC (US)

(72) Inventors: Carlos Vera-Ciro, Madison, WI (US); Robert Raymond Lindner, Fitchburg, WI (US)

(73) Assignee: VEDA Data Solutions, Inc., Madison, WI (US)

( * ) Notice: Subject to any disclaimer, the term of this patent is extended or adjusted under 35 U.S.C. 154(b) by 0 days.

(21) Appl. No.: 17/181,519

(22) Filed: Feb. 22, 2021

(65) Prior Publication Data

US 2021/0174380 A1   Jun. 10, 2021

Related U.S. Application Data

(63) Continuation of application No. 16/668,565, filed on Oct. 30, 2019, now abandoned.

(51) Int. Cl.
*G06Q 30/0201*   (2023.01)
*G06F 16/951*   (2019.01)
(Continued)

(52) U.S. Cl.
CPC ....... *G06Q 30/0201* (2013.01); *G06F 16/951* (2019.01); *G06F 40/295* (2020.01); *G06N 20/00* (2019.01)

(58) Field of Classification Search
USPC ...................................................... 705/7.29
See application file for complete search history.

(56) References Cited

U.S. PATENT DOCUMENTS 8,780,195 B1   7/2014  Rubin
9,529,359 B1   12/2016 Annan et al.
(Continued)

FOREIGN PATENT DOCUMENTS

CN         112817847 A    5/2021
WO    WO 2007149216 A2   12/2007

OTHER PUBLICATIONS

Mallieswari et al., Effect of Machine Learning in Healthcare Industry with reference to Artificial Intelligence, International Journal of Advanced Research in Computer Engineering & Technology, vol. 8, pp. 10-13 (Year: 2019).*

(Continued)

*Primary Examiner* — Allison M Robinson
(74) *Attorney, Agent, or Firm* — Sterne, Kessler, Goldstein & Fox, P.L.L.C.

(57) ABSTRACT

The present disclosure is directed to systems and methods for identifying demographic information in a data file. The method may include: receiving the data file containing a plurality of fields of demographic information from a third-party, the data file having inconsistent or mislabeled nomenclatures for one or more fields of the plurality of fields or spurious demographic information; analyzing the data file using a machine learning model trained according to other data files to distinguish between each of the plurality of fields of demographic information, the machine learning model being based on a plurality of machine learning algorithms to identify different types demographic information; generating a score indicating a probability that each of the plurality of fields of demographic information was identified correctly; and generating a revised data file labeling each of the plurality of fields of demographic information based on the identified type.

21 Claims, 8 Drawing Sheets

(51) Int. Cl.
*G06F 40/295* (2020.01)
*G06N 20/00* (2019.01)

(56) References Cited

U.S. PATENT DOCUMENTS

| | | | |
|---|---|---|---|
| 9,626,432 B2* | 4/2017 | Acevedo Arizpe | G06F 16/35 |
| 10,366,351 B2* | 7/2019 | Whittier | G06Q 10/00 |
| 10,387,825 B1 | 8/2019 | Canavor et al. | |
| 10,963,378 B2* | 3/2021 | Somech | G06F 3/0665 |
| 11,120,899 B1* | 9/2021 | Rai | G06F 40/295 |
| 11,862,305 B1* | 1/2024 | Sethi | G06N 20/00 |
| 2003/0182310 A1 | 9/2003 | Charnock et al. | |
| 2007/0282681 A1 | 12/2007 | Shubert et al. | |
| 2009/0119576 A1 | 5/2009 | Pepper et al. | |
| 2012/0053959 A1* | 3/2012 | Sengupta | G16H 10/60 706/54 |
| 2012/0209795 A1 | 8/2012 | Glickman | |
| 2012/0226719 A1 | 9/2012 | Sewall | |
| 2012/0272259 A1 | 10/2012 | Cortes et al. | |
| 2014/0195544 A1 | 7/2014 | Whitman | |
| 2014/0249865 A1* | 9/2014 | Ghani | G06Q 40/08 705/4 |
| 2016/0019197 A1* | 1/2016 | Lasi | G06F 40/174 715/224 |
| 2016/0135706 A1 | 5/2016 | Sullivan et al. | |
| 2016/0147943 A1* | 5/2016 | Ash | G16H 10/60 705/3 |
| 2016/0173827 A1 | 6/2016 | Dannan et al. | |
| 2016/0236790 A1 | 8/2016 | Knapp et al. | |
| 2016/0283350 A1* | 9/2016 | Akbulut | G06F 8/75 |
| 2016/0288905 A1 | 10/2016 | Gong et al. | |
| 2016/0314123 A1* | 10/2016 | Ramachandran | G06N 20/00 |
| 2017/0017638 A1 | 1/2017 | Satyavarta et al. | |
| 2017/0161725 A1 | 6/2017 | Hosp et al. | |
| 2017/0286622 A1 | 10/2017 | Cox et al. | |
| 2018/0060418 A1 | 3/2018 | Robichaud | |
| 2018/0121514 A1* | 5/2018 | Reisz | G06Q 40/03 |
| 2019/0113905 A1 | 4/2019 | Corr | G05B 19/408 |
| 2019/0213408 A1* | 7/2019 | Cali | G06K 9/00456 |
| 2019/0287685 A1* | 9/2019 | Wu | G06F 40/295 |
| 2019/0311299 A1 | 10/2019 | Lindner | |
| 2019/0392075 A1 | 12/2019 | Han et al. | |
| 2020/0004765 A1* | 1/2020 | Sørensen | G06F 18/214 |
| 2020/0273570 A1 | 8/2020 | Subramanian et al. | |
| 2021/0174380 A1 | 6/2021 | Vera-Ciro et al. | |

OTHER PUBLICATIONS

Huddar et al., Predicting Complications in Critical Care Using Heterogeneous Clinical Data, 2016, IEEE Access, vol. 4, 7988-8001 (Year: 2016).*

Meystre et a. BMC Medical Research Methodology (Year: 2010).*

* cited by examiner

| Name | Addrs. | PH# | FX# | Specialty | License No. | Expiration Date |
|------|--------|-----|-----|-----------|-------------|-----------------|
| Doe, John | 123 Maple Ave Somehwere, NJ 07005 | (973) 999-1234 | john.doe@doctor.org | IM | 123456 | 12/22/2020 |
| Doe, Jane | 123 Maple Ave Somehwere, NJ )7005 | (973) 999-1234 | jane.doe@doctor.org | Internal Medicine | 123457 | 12/22/2020 |

| Name | Group | | | |
|---|---|---|---|---|
| | Address #1 | Address #2 | Phone No. | Fax No. |
| Doctors_1 | 123 Maple Ave City, NJ 07005 | PO Box 123 Somehwere, NJ 07005 | (973) 999-1235 | (973) 999-1234 |
| Doctors_2 | 200 Main St. Town, VA 22182 | | (703) 280-0000 | (703) 280-0001 |

FIG. 4B

| Name | Group | |
|---|---|---|
| | Service | Billing |
| Doctors_1 | 123 Maple Ave City, NJ 07005 (973) 999-1235 | PO Box 123 Somehwere, NJ 07005 (973) 999-1234 |
| Doctors_2 | 200 Main St. Town, VA 22182 (703) 280-0000 | PO Box 123 Town, VA 22182 (703) 280-0001 |

| Group Name | | |
|---|---|---|
| Name | Addr | Name | Addr |
| John Doe | 123 Maple Somehwere, NJ 07005 | Jane Doe | 125 Maple Ave Somewhere, NJ 07005 |

FIG. 5A

| Name | Addrs. 1 | City 1 | State 1 | Addrs. 2 | City 2 | State 2 |
|---|---|---|---|---|---|---|
| Doe, John | 123 Maple Ave | Somewhere | NJ | 456 Main St. | Somehwere | NY |

FIG. 5B

| F Name | L Name | Street Address | City | State | Zip Code |
|--------|--------|----------------|------|-------|----------|
| John | Doe | 123 Maple Ave | Somehwere | NJ | 07005 |
| Jane | Doe | 123 Maple Ave | Somehwere | NJ | 07005 |

FIG. 6

EFFICIENT DATA PROCESSING TO IDENTIFY INFORMATION AND REFORMAT DATA FILES, AND APPLICATIONS THEREOF

RELATED APPLICATION

This application is continuation of U.S. patent application Ser. No. 16/668,565, filed on Oct. 30, 2019, the contents of which are hereby incorporated by reference in their entirety.

BACKGROUND

Field

This field is generally related to processing information.

Background

As technology advances, an ever increasing amount of demographic information is becoming digitized. For example, for healthcare providers, demographic information may include, but is not limited, to their name, address, specialties, academic credentials, certifications, and the like. This demographic information may be available from various public data sources, such as websites. These websites may retrieve the demographic information from underlying databases, such as state, county, city, or municipality databases, that store the data. For example, states may have licensing boards that maintain lists of all licensed healthcare providers, along with their associated demographic information. In another example, health insurance companies may have public websites listing the healthcare providers, and associated demographic information, in their network. In another example, healthcare providers may themselves set up public websites that list such demographic information about their practices.

Entities may have a need to maintain demographic information. For example, health insurance companies may have a need to maintain demographic information about healthcare providers that need to be reimbursed for claimed services. To maintain the demographic information, these entities often attempt to collect and integrate the demographic information from providers, hospitals, group practices, or the like. Often times responses to requests for this information have poor response rates, are poorly formatted, and may include inaccurate information. For example, the responses may be structured in an unknown format, may include inconsistent or mislabeled headings, or may include spurious information. As such, the responses should be reviewed to verify the contents of the data provided and reformatted into a consistent structure. However, the responses frequently include hundreds, if not thousands, of entries with any number of different types of demographic data. Consequently, manually reviewing and reformatting data from these responses may be difficult, time-consuming, and expensive, and often takes weeks per file to complete. These costs and time delays significantly contribute to the administrative overhead costs that account for about one third of healthcare premiums in the United States.

Thus, systems and methods are needed to improve reviewing and reformatting these responses into a validated format by automating expensive administrative tasks, thereby eliminating manual data formatting and reducing wasteful spending.

BRIEF SUMMARY

In an embodiment, the present disclosure is directed to a method for identifying demographic information in a data file. The method may include receiving the data file containing a plurality of fields of demographic information from a third-party. The data file may include inconsistent or mislabeled nomenclatures for one or more fields of the plurality of fields or spurious demographic information. The method may also include analyzing the data file using a machine learning model trained according to other data files to distinguish between each of the plurality of fields of demographic information. The machine learning model may be based on a plurality of machine learning algorithms to identify different types demographic information. The method may further include generating a score indicating a probability that each of the plurality of fields of demographic information was identified correctly. The method may also include generating a revised data file labeling each of the plurality of fields of demographic information based on the identified type.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 3-5B illustrate example data files received from the one or more data sources, according to aspects of the present disclosure.

FIG. 6 illustrates example revised data file, according to aspects of the present disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
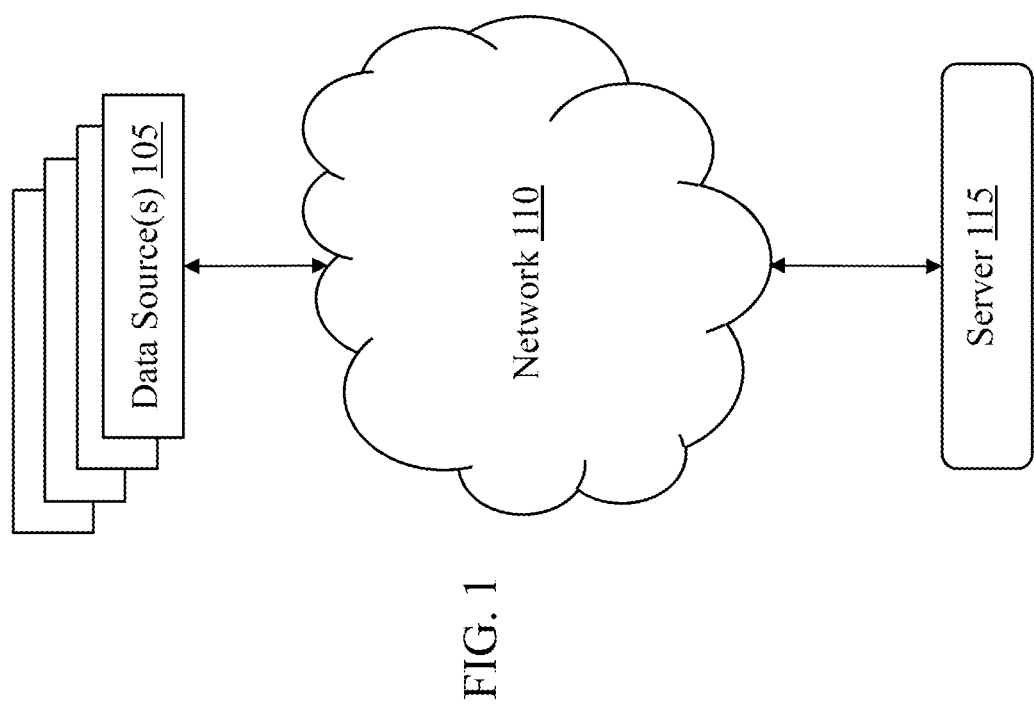
FIG. 1 illustrates a diagram of a network for communications between one or more data sources and a system, according to aspects of the present disclosure.

Embodiments provide ways to review and reformat data files that include inconsistent or mislabeled nomenclatures for one or more fields of a plurality of fields of demographic information or spurious demographic information, which would require weeks per file to review and reformat manually. For example, embodiments may analyze the data file using a machine learning model trained according to other data files to distinguish between each of the plurality of fields of demographic information. The machine learning model may be based on a plurality of machine learning algorithms to identify different types demographic information. For example, analyzing the data file may be based on a combination of one or more of semantic content of the demographic information, a shape of the demographic information, or metadata. In this way, embodiments provide the ability to identify different types of demographic data. Embodiments may also generate a score indicating a probability that each of the plurality of fields of demographic information was identified correctly. Embodiments may also generate a revised data file labeling each of the plurality of fields of demographic information based on the identified type. For example, the revised data file may be formatted based on the requirements of the third-party that provided the original data file. In other words, the revised data file may be fully customizable based on individual requests for the restructured data. Thus, embodiments provide the ability to effectively and efficient generate data files in a format that is most useful to the third party.

Furthermore, the present disclosure may implement a combination of a plurality of machine learning algorithms and rules, which improves the functionality of the computing device. Namely, the combination of machine learning algorithms and rules avoids overtraining, and thus overcomplicating, the machine learning model, thereby reducing the amount of resources, e.g., processing consumption and memory resources, required to generate reformatted data files. Additionally, in some aspects, the present disclosure may intelligently identify different types of demographic information based on a sampled portion of the data file, rather than the entire data file, which may include hundreds, if not thousands of entries. By identifying the different types of demographic information based on a sampled portion, the present disclosure may further reduce the amount of resources required to generate reformatted data files.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 is a diagram illustrating a network 100 for communications over a network 110 between one or more data sources 105 and a system 115. In some embodiments, the one or more data sources 105 may be any data source that maintains databases of demographic information of one or more individuals, such, as healthcare providers, including but not limited to, doctors, dentists, physician assistants, nurse practitioners, nurses, or the like. Although the present disclosure describes the individuals as being healthcare providers, it should be understood by those of ordinary skill in the arts that present disclosure may be implemented accumulating data from any data source. In some embodiments, the data sources 105 may be hosted on a server, such as a host server, a web server, an application server, etc., a data center device, or a similar device, capable of communicating via the network 110.

In some instances, the one or more data sources 105 may include a Center for Medicaid and Medicare (CMS) services data source, a directory data source, a Drug Enforcement Agency (DEA) data source, a public data source, a National Provider Identifier (NPI) data source, a registration data source, and/or a claims data source. The CMS data source may be a data service provided by a government agency. The database may be distributed and different agencies organizations may be responsible for different data stored in CMS data source. The CMS data source may also include data on healthcare providers, such as lawfully available demographic information and claims information. The CMS data source may also allow a provider to enroll and update its information in the Medicare Provider Enrollment System and to register and assist in the Medicare and Medicaid Electronic Health Records (EHR) Incentive Programs.

The directory data source may be a directory of healthcare providers. In one example, the directory data source may be a proprietary directory that matches healthcare providers with demographic and behavioral attributes that a particular client believes to be true. The directory data source may, for example, belong to an insurance company or a health system, and can only be accessed and utilized securely with the company's consent.

The DEA data source may be a registration database maintained by a government agency such as the DEA. The DEA may maintain a database of healthcare providers, including physicians, optometrists, pharmacists, dentists, or veterinarians, who are allowed to prescribe or dispense medication. The DEA data source may match a healthcare provider with a DEA number. In addition, DEA data source to may include demographic information about healthcare providers.

The public data source may be a public data source, perhaps a web-based data source such as an online review system. These data sources may include demographic information about healthcare providers, area of specialty, and behavioral information such as crowd sourced reviews.

The NPI data source may be a data source matching a healthcare provider to a NPI. The NPI is a Health Insurance Portability and Accountability Act (HIPAA) Administrative Simplification Standard. The NPI is a unique identification number for covered health care providers. Covered health care providers and all health plans and health care clearinghouses must use the NPIs in the administrative and financial transactions adopted under HIPAA. The NPI is a 10-position, intelligence-free numeric identifier (10-digit number). This means that the numbers do not carry other information about healthcare providers, such as the state in which they live or their medical specialty. NPI data source may also include demographic information about a healthcare provider.

The registration data source may include state licensing information. For example, a healthcare provider, such as a physician, may need to register with a state licensing board. The state licensing board may provide the registration data source information about the healthcare provider, such as demographic information and areas of specialty, including board certifications.

The claims data source may be a data source with insurance claims information. Like the directory data source, the claims data source may be a proprietary database. Insurance claims may specify information necessary for insurance reimbursement. For example, claims information may include information on the healthcare provider, the services performed, and perhaps the amount claimed. The services performed may be described using a standardized code system, such as ICD-9. The information on the healthcare provider could include demographic information.

The one or more data sources 105 may receive data files from any number of origins, e.g., multiple practice groups, other ones of the plurality of data sources 105, etc. For example, the one or more data sources 105 may receive responses to requests for demographic information from, for example, medical practice groups, hospitals, or the like. This information may be entered by an administrator, and as such, the data file may include inconsistent or mislabeled nomenclatures for one or more fields of a plurality of fields of demographic information or it may include spurious demographic information. As another example, the one or more data sources 105 may acquire another entity that utilizes different nomenclatures for one or more fields of the plurality of fields. In some implementations, one or more of the plurality of data sources 105 may transmit a data file containing the plurality of fields of demographic information to the server 115.

In some embodiments, the data file may include a table of information having any number of headings labeling a plurality of fields of demographic information. For example, as illustrated in FIG. 3, the data file may include a table having the headings "Name," "Addrs.," "PH #," "FX #," "Specialty," "License No.," and "Expiration Date." However, as illustrated in FIG. 3, the demographic information provided under the heading "FX #" are a number of email addresses. Furthermore, as illustrated in FIG. 3, one of the entries under the heading "Addrs." includes a typographical error in the zip code. As further shown in FIG. 3, the data file may include extraneous metadata and/or superfluous information. Namely, as shown in FIG. 3, the data file may include, for example, "Author Name" and "Date Generated," indicated who authored the data file and the date it was created.

In further embodiments, the data file may include a table of information having a heading and subheadings. For example, as illustrated in FIG. 4A, the data file may have a heading labeled "Group" with subheadings labeled "Name," "Address #1," "Address #2," "Phone No.," and "Fx #." In another example, as illustrated in FIG. 4B, the data file may have a heading labeled "Group" with subheadings labeled "Name," "Billing," and "Service." In yet another example, as illustrated in FIG. 5A, the data file may have a heading labeled "Group Name" with subheadings labeled "Name," "Addr," "Name," and "Addr." Thus, as illustrated in the examples shown in FIGS. 3-5B, the data file may have inconsistent or mislabeled nomenclatures or spurious demographic information. In some instances, the format of each data file having the demographic information may be inconsistent from source to another.

The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
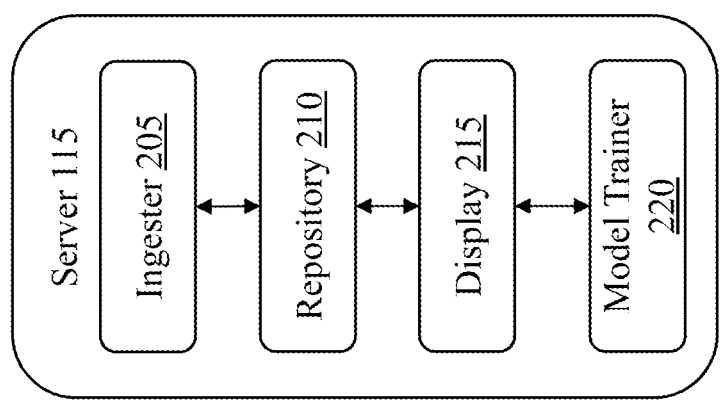
FIG. 2 illustrates a diagram of a system for reviewing and reformatting data files from the one or more data sources, according to aspects of the present disclosure.

To review and reformat the data files from the data sources 105, the server 115 may include an ingester 205, a repository 210, a display 215, and a model trainer 220, as illustrated in FIG. 2. In some embodiments, the ingester 205 may analyze the data file using a machine learning model trained according to other data files to distinguish between each of the plurality of fields of demographic information. For example, in some embodiments, the model trainer 220 may train the machine learning model using a number of Monte Carlo training sets having sample data files. That is, the model trainer 220 may use a sample set generated by humans identifying demographic information in a data file. In some embodiments, the machine learning model may be based on a plurality of machine learning algorithms to identify different types of demographic information. In some embodiments, the plurality of machine learning algorithms may be supervised machine learning algorithms including, but are not limited to, support vector machines, linear regression, logistic regression, naive Bayes, linear discriminant analysis, decision trees, k-nearest neighbor algorithm, neural networks, and similarity learning. It should be understood by those of ordinary skill in the art that these are merely example supervised machine learning algorithms and that other supervised machine learning algorithms may be used in accordance with aspects of the present disclosure.

As one example, the ingester 205 may analyze the data file by analyzing semantic content of each of the plurality of fields of demographic information to identify the different types of demographic information. For example, the ingester 205 may identify semantic content, such as a state name or state abbreviation, which indicates that the demographic information is likely an address, rather than, for example, a phone number or facsimile number. Similarly, the ingester 205 may identify semantic content, such as street names (e.g., Avenue, Road, Street, Lane, etc.) and/or their associated abbreviations (e.g., Ave., Rd. St. Ln., etc.), which would likewise also indicate that the demographic information is an address. Even further, the ingester 205 may identify semantic content, such as state names (or country names) and/or their associated abbreviations, which would likewise also indicate that the demographic information is an address. In some embodiments, the ingester 205 may also be able to identify a billing address based on the semantic content. For example, the semantic content may include, for example, a PO Box number, which would indicate that the content is a billing address, rather than a service address. In yet another example, the ingester 205 may identify the semantic content, such as a hyperlink, which may indicate that the demographic information is an email address. It should be understood by those of ordinary skill in the arts that these are merely examples of semantic content that may be identified, and that other types of semantic content are contemplated in accordance with aspects of the present disclosure.

As another example, the ingester 205 may analyze the data file by analyzing a shape of each of the plurality of fields of demographic information to identify the different types of demographic information. For example, the ingester 205 may analyze the demographic information to identify the number of characters, the type of the characters (e.g., numeric versus letter characters), the number of non-alphanumeric characters (e.g., spaces, commas, periods, or the like), and an overall arrange of the alphanumeric characters and non-alphanumeric characters. For example, the shape of the demographic information may be "XXX[comma][space]XXX" or "XXX[comma][space]XXX [space]X[period]", with each X representing a letter character, which are common formats identifying names. In another example, the shape of the demographic information may be ###XXX [space]XXX [space]XXX[comma]XX[space] ##### (or #####=####), with each # representing a numeric character and each X representing a letter character, which is a common format of an address. However, some data files may use a full state name, rather than the two letter abbreviation for the state, and as such, the ingester 205 may identify the state within an address based on the semantic content, as discussed herein. In yet another example, the ingester 205 may identify the shape of the demographic information, such as XXX@XXX[period]XXXX, which indicates that the demographic information is an email address. It should be understood by those of ordinary skill in the arts that these are merely examples of shapes of demographic content that may be identified, and that other types of shapes of demographic content are contemplated in accordance with aspects of the present disclosure.

As yet another example, the ingester 205 may analyze the data file by analyzing metadata of each of the plurality of fields of demographic information to identify the different types of demographic information. For example, the metadata may include each nomenclature of the headings. In some instances, the semantic content and shapes of the demographic information may be similar. For example, phone numbers and facsimile numbers may have similar semantic content and shapes. In another example, service addresses and billing addresses may have similar semantic content and shapes. To differentiate between demographic information having similar semantic content and shapes, the ingester 205 may analyze the metadata of the headings (or subheadings). For example, the ingester 205 may identify common nomenclatures used for the different types of demographic information. For example, common nomenclatures for phone numbers may include, but are not limited to, "Phone No.," "Phone Number," "P:," "PH No.," or the like, whereas common nomenclatures for facsimile numbers may include, but are not limited to, "Fax No.," "Fax Number," "F:," "FX No.," or the like. Likewise, common nomenclatures for service addresses may include the terms, for example, "Service," "Serv.," or the like, or the service address may be listed only as "Address" or some variation thereof, whereas the billing address may be specifically identified as such. Furthermore, the ingester 205 may analyzed layered headings, as illustrated in the examples shown in FIGS. 3 and 4A-B. Using the data file shown in FIG. 3, the ingester 205 may analyze the headings "Author Name" and "Date Generated," and determine that these fields are merely extraneous metadata and/or superfluous information that should be removed when reformatting the data file. As another example, using the data file shown in FIG. 4A, the ingester 205 may analyze the primary heading and subheadings, and determine that the demographic information provided below the primary heading is related to a practice group, i.e., a group name, group service address, group billing address, group phone number, and group facsimile number. In yet another example, using the data file shown in FIG. 4B, the ingester 205 may analyze the primary heading and subheadings, and determine that the demographic information provided below the primary heading is related to a practice group, i.e., a group name, however the remaining subheadings are "Service" and "Billing," and the ingester 205 may determine that the demographic information provided under these subheadings are a billing address, billing phone number, service address, and service phone, respectively.

In some embodiments, the machine learning model may also be trained on respective rules for common types of demographic information. For example, the rules may include a rule that a five digit number or a five digit number followed by a hyphen and another four digit number is a zip code, as these are the only available formats for zip codes. As another example, an NPI may be formatted as a ten digit number with the first digit being a "1," and as such, the rules may include a rule indicating that any ten digit number commencing with a "1" is an NPI. In a further example, the rules may include a rule for determining responses to binary pieces of demographic information, e.g., whether a healthcare provider is accepting new patients—"Yes"/"Y" or "No"/"N." By using rules for common types of demographic information, the present disclosure avoids overtraining, and thus overcomplicating, the machine learning model and also improves efficiency of the machine learning model. In some embodiments, these rules may be defined as regular expressions, however it should be understood by those ordinary skill in the arts that other types of rules may be used.

In some embodiments, the ingester 205 may analyze the inter-columnar relationship between multiple columns. For example, as illustrated in FIG. 5A, the data file includes alternating headings of "Name" and "Addr." After reviewing the semantic content, shape, and metadata of the rows under each column, the ingester 205 may determine that the respective types of demographic information are names and addresses. Furthermore, by analyzing the inter-columnar relationship between multiple columns, the ingester 205 may determine that the alternating headings should be grouped as pairs, e.g., a healthcare provider name and their associated address. As another example illustrated in FIG. 5B, the data file may include multiple addresses for a single healthcare provider, i.e., "Addrs. 1," "City 1," "State 1," as well as "Addrs. 2," "City 2," "State 2." In this instance, the ingester 205 may determine that each address is associated with the same healthcare provider, and separate each address into separate entries, e.g., separate row of information, in a revised data file, while still associating the addresses with the same healthcare provider.

The ingester 205 may also generate a score indicating a probability that each of the plurality of fields of demographic information was identified correctly. For example, the ingester 205 may generate a baseline score for each of the plurality of fields of demographic information, which may then be adjusted. For example, the ingester 205 may increase the scores for demographic information having well-known semantic content and/or shapes, e.g., zip codes and NPIs. Additionally, the ingester 205 may increase or decrease the score based on whether the heading correctly identifies the associated demographic information, e.g., whether the heading correctly identifies "NPIs." For example, the score may be decreased when the heading and the content do not match, whereas the score may be increased when the heading and content match. In some embodiments, ingester 205 may increase the score based on whether demographic information having similar semantic content and/or shapes have been detected. For example, the ingester 205 increases the score for a telephone number or address if only a single piece of demographic information having the given semantic content and/or shape is identified. However, in the event two or more identified fields of demographic information having the same semantic content and/or shape are identified (e.g., a phone number and a facsimile number or a service address and a billing address), the ingester 205 may decrease the score for both of the two or more identified fields of demographic information, and these identified fields may have the same score. Furthermore, in some situations, the ingester 205 may generate an alert notifying an administrator of the two or more identified fields of demographic information having the same semantic content and/or shape, such that the administrator may provide input to resolve the conflict.

To resolve this, the ingester 205 may apply additional processing to distinguish between the two or more identified fields of demographic information. For example, in some embodiments, the ingester 205 may cross-check at least one of the plurality of fields of demographic information against known demographic information stored in, for example, the repository 210. For example, the ingester 205 may cross-check an identified phone number and an identified facsimile number against known phone numbers and facsimile numbers to verify which is the phone number and which is the facsimile number. In some embodiments, the ingester 205 may sequentially check the digits of the phone and facsimile numbers until the ingester 205 determines that one of the two is a phone number. In some instances, only one of the two identified fields of demographic information may be known, e.g., the phone number, and the ingester 205 may identify one of the two or more identified fields of demographic information, accordingly, with the remaining field of demographic information being identified as the most reasonable alternative (e.g., the facsimile number). Similarly, the ingester 205 may cross-check other pieces of demographic information, such as the NPI, service addresses, and billing addresses. It should be understood by those of ordinary skill in the arts that these are merely examples of the types of demographic information that may be cross-checked, and that other types of demographic information may be cross-checked in accordance with aspects of the present disclosure.

Additionally, the ingester 205 may identify incorrect information and, in some instances, update the incorrect information. For example, as illustrated in FIG. 3, the zip code in the address associated with "Jane Doe" included a typographical error, and to fix this error, the ingester 205 may query the repository 210 to identify a correct zip. Additionally, or alternatively, the ingester 205 may compare the incorrect zip code to other zip codes of the data file, e.g., the zip code associated with "John Doe," as illustrated in FIG. 3. As the addresses of "Jane Doe" and "John Doe" have the same street address, city, and state, the ingester 205 may determine the zip code associated with "John Doe" is the correct zip code and update the zip code for "Jane Doe" accordingly. Additionally, the ingester 205 may determine whether identified information is corrected by cross-checking, for example, identified phone numbers against known phone numbers. In some instances, the cross-checking may confirm that the identified numbers are indeed phone numbers. In other instances, the cross-checking may determine that the identified phone numbers were incorrectly labeled in the data file, and in fact, are facsimile numbers, rather than phone numbers.

In some embodiments, the ingester 205 may analyze a limited number of rows of demographic information in the data file (i.e., less than the full number of rows in the data file) to improve the overall efficiency of the ingester 205. For example, after analyzing the semantic content, shape, and metadata of a number of rows, the ingester 205 may be able to identify the type of demographic information of each of the plurality of fields of demographic information, and assume that all remaining rows that have not been analyzed are the identified type of demographic information. Furthermore, the ingester 205 may generate the revised data file in smaller segments of rows, rather than the entire data file, which may require substantial amounts of resources, e.g., processing consumption and memory resources. By assuming the type of demographic information of the remaining rows, the ingester 205 reduces the overall amount of resources used and improves the efficiency of the server 115.

Once the plurality of fields of demographic information have been identified and corrected as needed, the ingester 205 may generate a revised data file labeling each of the plurality of fields of demographic information based on the identified type. In some embodiments, the ingester 205 may generate a revised data file having a format that is customized according to a request from the data source 105. For example, the requested format may be a format that is consistent with preexisting data files of the data source 105. As another example, the requested format may be an entirely new format. For example, as illustrated in FIG. 6, the data source 105 may request that the demographic information be separated into "F_Name," "L_Name," "Street Address," "City," "State," and "Zip Code." To achieve this, the ingester 205 may identify fields for the requested format and parse through the identified types of demographic information to determine which demographic information belongs in which field of the requested format. That is, for example, when the ingester 205 identified the demographic information as being "Last Name, First Name" or "Full Name," the ingester 205 may parse the demographic information and separate them into different fields in the revised data file, i.e., "First Name" and "Last name." That is, the ingester may generate new columns by separating a column of a single type of demographic information (e.g., "Full Name") into different separate columns parsing the single type of demographic information into separate subcomponents (e.g., "First Name" and "Last Name" as separate columns). Likewise, the ingester 205 may generate a new columns by combining separate columns of information (e.g., "First Name" and "Last Name") into a single column (e.g., "Full Name"). It should be understood by those of ordinary skill in the arts that this is merely an example, and that the ingester 205 may parse other types of demographic information in accordance with aspects of the present disclosure. In further embodiments, the ingester 205 may separate a single incoming data file into any number of revised data files.

In some instances, a given piece of demographic information may not match what the ingester 205 identified as the type of demographic information. For example, the ingester 205 may identify one of the plurality of fields of demographic information as being NPIs, but one entry may not match the known format for an NPI. In such circumstances, the ingester 205 may pass through the mismatching demographic information untouched, render the value null, or insert special characters flagging the particular entry. Alternatively, the ingester 205 may generate an alert notifying an administrator of the mismatching demographic information, such that the administrator may provide input to resolve the discrepancy.

In some embodiments, the ingester 205 may determine additional information based on the identified demographic information. For example, using the address of the identified address, the ingester 205 may determine the geolocation or coordinates of the healthcare provider. As another example, the ingester 205 may supplement a missing zip code based on a known street address, city, and state. The ingester 205 may include such additional information in the revised data file upon request. The ingester 205 may store the revised data file in the repository 210, and the server 115 may transmit the revised data file to the data source 105 over the network 110.

Figure 7:
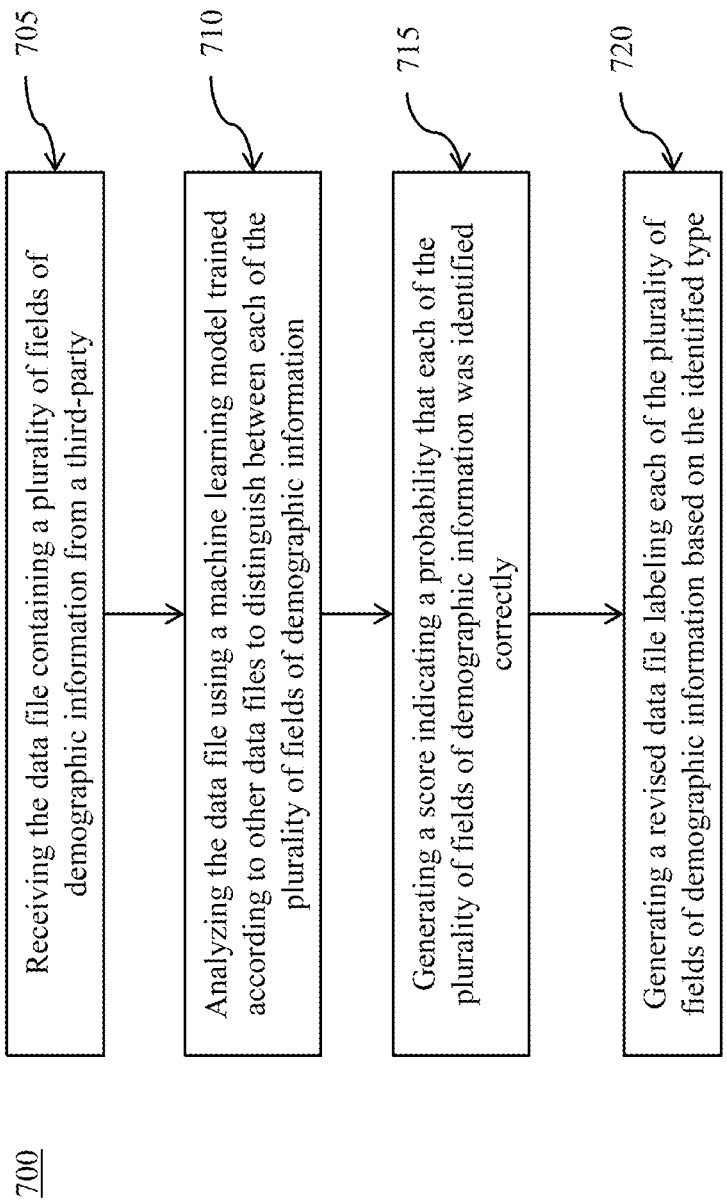
FIG. 7 illustrates a method of reformatting data from a data source, according aspects of the present disclosure.

FIG. 7 illustrates a method for identifying demographic information in a data file.

At 705, a computing device, e.g., server 115, may receive the data file containing a plurality of fields of demographic information from a third-party. The data file may have inconsistent or mislabeled nomenclatures for one or more fields of the plurality of fields or spurious demographic information.

At 710, the computing device, e.g., server 115, may analyze the data file using a machine learning model trained according to other data files to distinguish between each of the plurality of fields of demographic information. The machine learning model may be based on a plurality of machine learning algorithms to identify different types demographic information.

At 715, the computing device, e.g., server 115, may generate a score indicating a probability that each of the plurality of fields of demographic information was identified correctly.

At 720, the computing device, e.g., server 115, may generate a revised data file labeling each of the plurality of fields of demographic information based on the identified type.

Each of the servers and modules described above can be implemented in software, firmware, or hardware on a computing device. A computing device can include but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions in a non-transitory manner. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Figure 8:
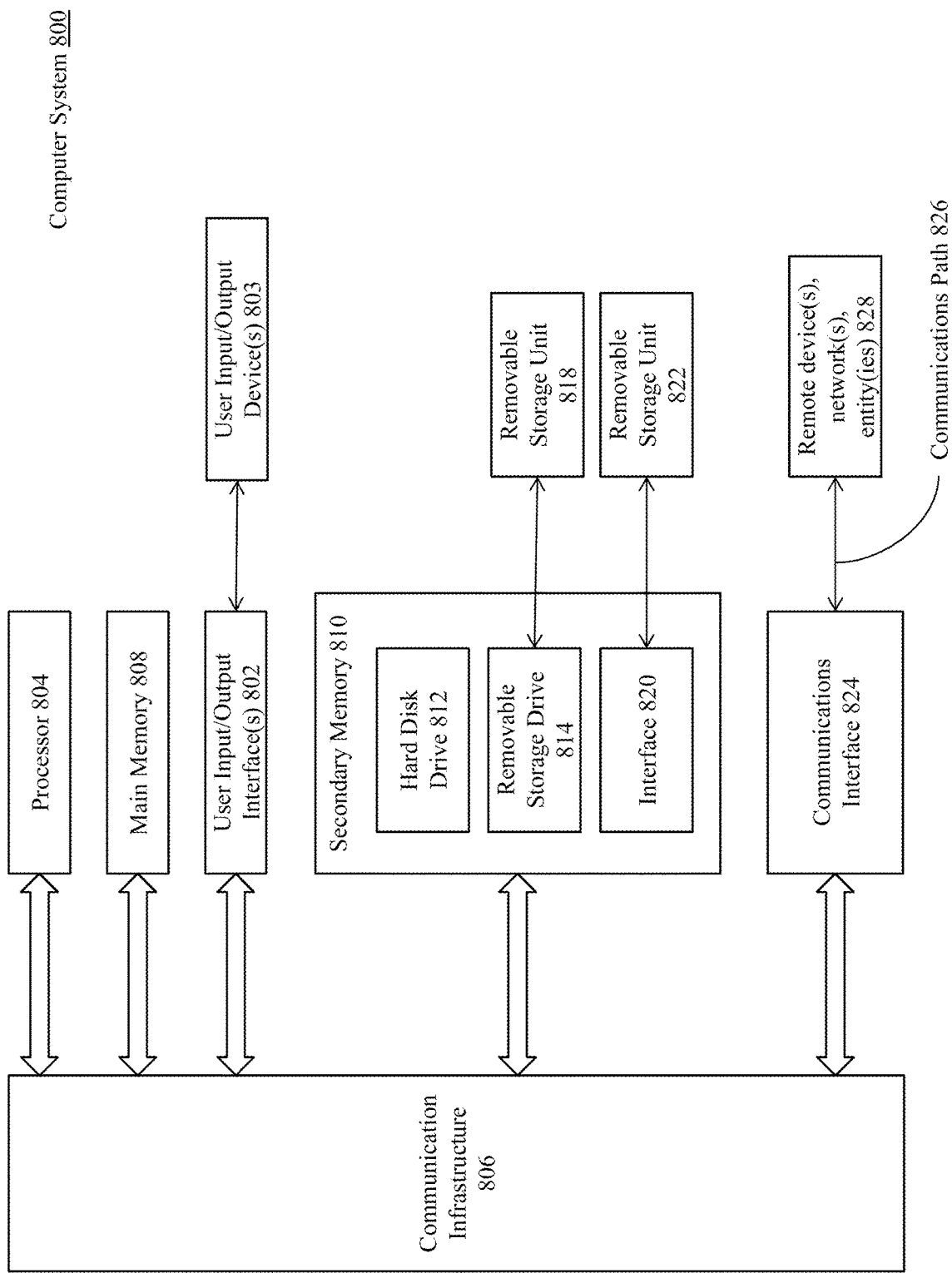
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), a comma-separated values (CSV), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system embodiments other than those described herein.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method of identifying demographic information in a data file, comprising:
    training a machine learning model according to labeled, sampled training sets to identify a heading based at least in part on structure and content of the data file from a data source with information describing medical providers, the machine learning model being based on a plurality of machine learning algorithms to identify different types of demographic information;
    receiving, by a processor, data files containing a plurality of fields of demographic information from a plurality of third-party sources, the data files having inconsistent or mislabeled nomenclatures with one another for one or more fields of the plurality of fields of demographic information;
    analyzing, by the processor, the heading identifying a plurality of strings representing a field of demographic information in the data files using the machine learning model, wherein the analyzing is performed across two or more fields of demographic information to identify a relationship between headings, wherein the identification of the relationship further comprises:
        determining types of demographic information;
        determining whether the headings should be grouped as pairs; and
        determining whether entries of each of the headings describe a same medical provider; and
    generating, by the processor, a score indicating a probability that each of the plurality of fields of demographic information was identified correctly, wherein the generating the score further comprises:
        generating a baseline score for each of the plurality of fields of demographic information; and
        adjusting the baseline score to increase the score when the heading and content of the field of demographic information match, or to decrease the score when the heading and the content of the field of demographic information do not match;
    generating, by the processor, a revised data file labeling each of the plurality of fields of demographic information based on the identified type; and
    inserting, by the processor and in the revised data file, missing fields of demographic information based on the identified type of demographic information.

2. The method of claim 1, wherein analyzing the data file comprises analyzing semantic content of each of the plurality of fields of demographic information to identify the different types of demographic information.

3. The method of claim 1, wherein analyzing the data file comprises analyzing a shape of each of the plurality of fields of demographic information to identify the different types of demographic information.

4. The method of claim 1, wherein analyzing the data file comprises analyzing metadata of each of the plurality of fields of demographic information to identify the different types of demographic information.

5. The method of claim 4, wherein the metadata includes each nomenclature of each of the plurality of fields of demographic information.

6. The method of claim 1, wherein, in response to identifying different ones of the plurality of fields of demographic information, the method further comprises cross-checking at least one of the plurality of fields of demographic information against known demographic information.

7. The method of claim 1, further comprising transmitting the revised data file to a third-party.

8. The method of claim 1, wherein the analyzing comprises distinguishing between each of the plurality of fields of demographic information based on a position of the heading in the data files with respect to another position of another heading in the data files.

9. A system for identifying demographic information in a data file, comprising:
    a memory that stores instructions for identifying the demographic information in the data file; and
    a processor configured to execute the instructions that cause the processor to:
        train a machine learning model according to labeled, sampled training sets to identify a heading based at least in part on structure and content of the data file from a data source with information describing medical providers, the machine learning model being based on a plurality of machine learning algorithms to identify different types of demographic information;

receive, by the processor, data files containing a plurality of fields of demographic information from a plurality of third-party sources, the data files having inconsistent or mislabeled nomenclatures with one another for one or more fields of the plurality of fields of demographic information;

analyze, by the processor, the heading identifying a plurality of strings representing a field of demographic information in the data files using the machine learning model, wherein the analyze is performed across two or more fields of demographic information to identify a relationship between headings, wherein the identification of the relationship further comprises the instructions that cause the processor to:
 determine types of demographic information;
 determine whether the headings should be grouped as pairs;
 determine whether entries of each of the headings describe a same medical provider; and generate, by the processor, a score indicating a probability that each of the plurality of fields of demographic information was identified correctly, wherein the generate the score further comprises the instructions that cause the processor to:
 generate a baseline score for each of the plurality of fields of demographic information; and
 adjust the baseline score to increase the score when the heading and content of the field of demographic information match, or to decrease the score when the heading and the content of the field of demographic information do not match;

generate, by the processor, a revised data file labeling each of the plurality of fields of demographic information based on the identified type; and insert, by the processor and in the revised data file, missing fields of demographic information based on the identified type of demographic information.

10. The system of claim 9, wherein analyzing the data file comprises analyzing semantic content of each of the plurality of fields of demographic information to identify the different types of demographic information.

11. The system of claim 9, wherein analyzing the data file comprises analyzing metadata of each of the plurality of fields of demographic information to identify the different types of demographic information.

12. The system of claim 11, wherein the metadata includes each nomenclature of each of the plurality of fields of demographic information.

13. The system of claim 9, wherein analyzing the data file comprises analyzing each nomenclature to identify the different types of demographic information.

14. The system of claim 9, wherein, in response to identifying different ones of the plurality of fields of demographic information, the instructions further cause the processor to cross-check at least one of the plurality of fields of demographic information against known demographic information.

15. The system of claim 9, wherein the instructions further cause the processor to transmit the revised data file to a third-party.

16. A non-transitory program storage device having instructions stored thereon that, when executed by at least one computing device, causes the at least one computing device to perform operations, the operations comprising:

training a machine learning model according to labeled, sampled training sets to identify a heading based at least in part on structure and content of a data file from a data source with information describing medical providers, the machine learning model being based on a plurality of machine learning algorithms to identify different types of demographic information;

receiving data files containing a plurality of fields of demographic information from a plurality of third-party sources, the data files having inconsistent or mislabeled nomenclatures with one another for one or more fields of the plurality of fields of demographic information;

analyzing the heading identifying a plurality of strings representing a field of demographic information in the data files using the machine learning model, wherein the analyzing is performed across two or more fields of demographic information to identify a relationship between headings, wherein the identification of the relationship further comprises:
 determining types of demographic information;
 determining whether the headings should be grouped as pairs; and
 determining whether entries of each of the headings describe a same medical provider; and generating a score indicating a probability that each of the plurality of fields of demographic information was identified correctly, wherein the generating the score further comprises:
 generating a baseline score for each of the plurality of fields of demographic information; and
 adjusting the baseline score to increase the score when the heading and content of the field of demographic information match, or to decrease the score when the heading and the content of the field of demographic information do not match;

generating a revised data file labeling each of the plurality of fields of demographic information based on the identified type; and inserting in the revised data file, missing fields of demographic information based on the identified type of demographic information.

17. The non-transitory program storage device of claim 16, wherein analyzing the data file comprises analyzing semantic content of each of the plurality of fields of demographic information to identify the different types of demographic information.

18. The non-transitory program storage device of claim 16, wherein analyzing the data file comprises analyzing a shape of each of the plurality of fields of demographic information to identify the different types of demographic information.

19. The non-transitory program storage device of claim 16, wherein analyzing the data file comprises analyzing metadata of each of the plurality of fields of demographic information to identify the different types of demographic information.

20. The non-transitory program storage device of claim 19, wherein the metadata includes each nomenclature of each of the plurality of fields of demographic information.

21. The non-transitory program storage device of claim 16, wherein, in response to identifying different ones of the plurality of fields of demographic information, the operations further comprise cross-checking at least one of the plurality of fields of demographic information against known demographic information.

* * * * *